United States Patent [19]
Preston et al.

[11] Patent Number: 6,120,402
[45] Date of Patent: Sep. 19, 2000

[54] HYDRAULIC TENSIONER WITH EXTERNAL RACK HAVING BACKLASH RESTRICTION

[75] Inventors: Todd K. Preston, Horseheads; Roger T. Simpson, Ithaca, both of N.Y.

[73] Assignee: BorgWarner Inc., Troy, Mich.

[21] Appl. No.: 09/231,783

[22] Filed: Jan. 15, 1999

Related U.S. Application Data

[60] Provisional application No. 60/101,260, Sep. 21, 1998.

[51] Int. Cl.[7] ................ F16H 7/08; F16H 7/22
[52] U.S. Cl. ........................ 474/109; 474/110
[58] Field of Search ................ 474/101, 109, 474/110, 111, 113, 117, 135, 138, 140, 115

[56] References Cited

U.S. PATENT DOCUMENTS

| | | | |
|---|---|---|---|
| 3,081,643 | 3/1963 | Huboi et al. . | |
| 3,802,286 | 4/1974 | Winklhofer et al. | 74/242 |
| 3,812,733 | 5/1974 | Yoshida | 74/242.11 |
| 4,713,043 | 12/1987 | Biedermann | 474/111 |
| 4,792,322 | 12/1988 | Goppeit et al. | 474/136 |
| 4,822,320 | 4/1989 | Suzuki | 474/111 |
| 4,874,352 | 10/1989 | Suzuki | 474/110 |
| 5,004,448 | 4/1991 | Ojima | 474/111 |
| 5,006,095 | 4/1991 | Suzuki | 474/110 |
| 5,073,150 | 12/1991 | Shimaya | 474/110 |
| 5,259,820 | 11/1993 | Mott | 474/110 |
| 5,304,099 | 4/1994 | Deppe et al. | 474/110 |
| 5,346,436 | 12/1994 | Hunter et al. . | |
| 5,653,653 | 8/1997 | Ledvina | 474/110 |
| 5,713,809 | 2/1998 | Yamamoto et al. | 474/110 |
| 5,908,363 | 6/1999 | Suzuki | 474/109 |
| 5,967,921 | 10/1999 | Simpson et al. | 474/110 |

FOREIGN PATENT DOCUMENTS 0106325  4/1984  European Pat. Off. .

OTHER PUBLICATIONS

European Search Report in counterpart EPO Appl. No. EP 99307056.4 dated Apr. 4, 2000.

*Primary Examiner*—David A. Bucci
*Assistant Examiner*—Matthew A. Kaness
*Attorney, Agent, or Firm*—Sidley & Austin; Greg Dziegielewski

[57] ABSTRACT

A hydraulic tensioner having an external rack member. The rack member has an extending member at its upper end that contacts wedges or grooves along the exterior of the piston to limit backdrive or backlash of the piston. The rack member has an end member at its lower end that is located in a groove in the tensioner housing. The rack member has a plurality of portions that are held together by a garter spring to form a single cylindrical piece.

6 Claims, 3 Drawing Sheets

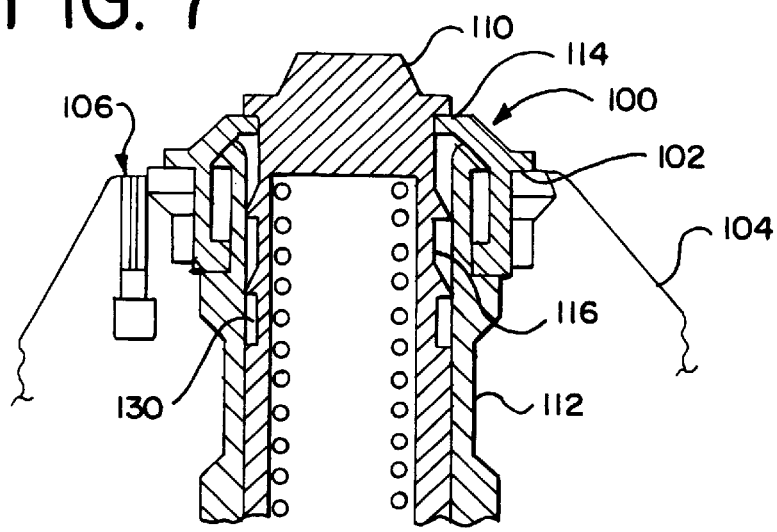
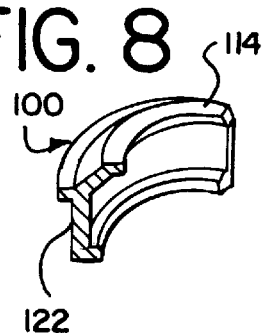
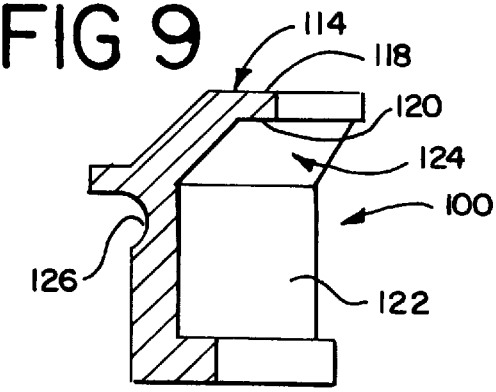
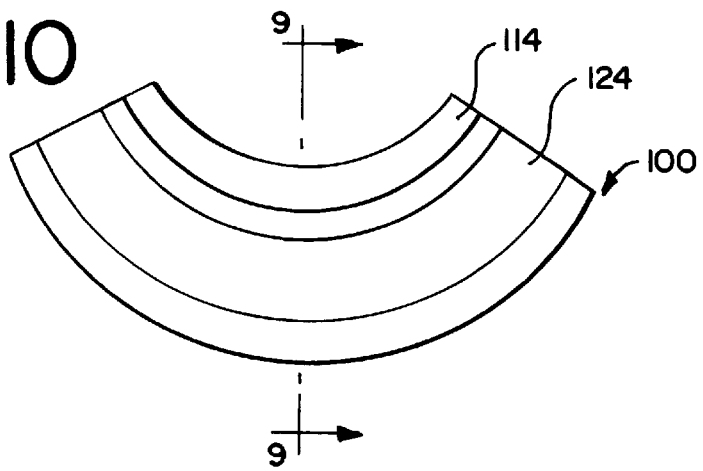

HYDRAULIC TENSIONER WITH EXTERNAL RACK HAVING BACKLASH RESTRICTION

Reference is made to co-pending U.S. application Ser. No. 08/852,925, filed May 8, 1997, entitled "Hydraulic Tensioner With External Rack," and provisional application Ser. No. 60/101,260, filed Sep. 21, 1998, the subject matter of which relates to the present invention and are both incorporated herein by reference.

BACKGROUND OF THE INVENTION

The present invention relates to a hydraulic chain tensioner having an external rack. More particularly, the hydraulic tensioner of the present invention has an external rack that limits the maximum piston travel and limits or restricts backlash.

Hydraulic tensioners are typically used as a control device for a chain drive in an automobile engine timing system. The tension in the chain can vary greatly due to the wide variation in the temperature and the linear expansion among the various parts of the engine. Moreover, wear to the chain components during prolonged use can produce a decrease in the tension of the chain. A hydraulic tensioner is used to take up the slack in the chain or belt that connects the camshafts to the crankshaft of the engine timing system. The tensioner piston must be able to extend outward as the chain stretches from higher engine speed and withdraw back inward when the chain loads have decreased with lower engine speeds. The piston travel from idle to maximum engine speed for most overhead cam engines ranges from 1 to 4 mm.

A typical hydraulic tensioner is comprised of a housing having a bore, a piston biased in a protruding direction from the bore by a spring, and a fluid chamber defined by the hollow piston and bore. A check valve is also included in the hydraulic tensioner to permit fluid flow from a source of pressurized fluid into a reservoir or oil supply passage into the fluid chamber, while preventing back flow in the reverse direction. The force of the chain against the piston in an inward direction is balanced by the resistance force of the fluid and the force of the spring in an outward direction.

A typical hydraulic tensioner usually has a no-return function, where the piston moves easily in one direction, but with more difficultly in the reverse direction. When the engine is started, the oil supply pressure to the tensioner is delayed by several seconds. During this time, the tensioner may not have enough oil to fill the fluid chamber. As a result, the piston could be pushed to the bottom of the tensioner bore from the chain motion. A proper load would not be maintained on the chain and noise could be generated. In addition, the lower piston position might even allow the chain to jump a tooth on either the crank or cam sprockets.

One example of a tensioner having a no-return function is shown in Winklhofer et al., U.S. Pat. No. 3,802,286. The piston of the Winklhofer et al. tensioner has a spiral rack on the inside wall of the bore to limit back travel and prevent the piston from retracting. Another example of a tensioner having a no-return function, Yoshida, U.S. Pat. No. 3,812,733, has a ratchet system with grooves on the outside of a piston and a detent with a spring to prevent the piston from advancing and retracting. Similarly, in U.S. Pat. No. 4,713,043, Biedermann includes grooves on the outside of the piston with a spring-loaded catch.

The rack or no-return system must also permit some backlash or limited backward piston movement. In U.S. Pat. No. 4,792,322, Goppelt addresses the problem of insufficient backlash by including an internal ring and groove system. An additional ring and groove are also used to hold the piston in place during shipping. This system is expensive because the grooves must be on the inside of the tensioner bore as well as on the outside of the piston.

Suzuki, U.S. Pat. No. 4,822,320 also provides an anti-backlash rack with grooves broached into the outside of the piston. A ratchet is pivotally connected to a housing to allow positive backlash. Suzuki also provides this ratchet system in U.S. Pat. No. 4,874,352, where the ratchet is supported by a spring, and in U.S. Pat. No. 5,006,095, where the number of teeth on the ratchet is n times that of the teeth on the rack. In addition, Shimaya, U.S. Pat. No. 5,073,150, incorporates the ratchet mechanism of Suzuki with a different tensioner.

Another example of a ratchet mechanism is disclosed in Deppe et al., U.S. Pat. No. 5,304,099. The ratchet mechanism of Deppe et al. includes grooves on the outside of a piston and a ratchet plunger biased by a spring. The ratchet is disengaged during normal operations and engaged during shut down to maintain the tensioner in an operative position.

An example of a mechanism that limits the travel of a shaft device is disclosed in Ojima, U.S. Pat. No. 5,004,448. A coil portion contacts a tension rod. The coil acts as a friction brake by causing an enlargement to prevent advancement of the rod or a shrinkage of the diameter of the coil portion to release the rod from the tensioner.

Mott, U.S. Pat. No. 5,259,820, provides an internal ratchet system positioned within the mounting cavity and constructed from a cylinder having two helical openings. The piston engages with the helical openings when the piston experiences sufficient force to be pushed inward. As a result, this tensioner provides tension to the chain when the fluid pressure to the tensioner is low.

Similarly, in the present invention, an external rack is provided to provide tension during low pressure conditions. The anti-backlash feature permits the piston to move back several millimeters more than the average piston when the engine is running. The radially extending member of the external rack slides back and forth in a series of slots or grooves formed along the exterior surface of the piston, while a garter spring member biases the external rack against the piston.

SUMMARY OF THE INVENTION

The present invention is directed to a hydraulic chain tensioner having an external rack. The tensioner includes a housing with a central bore. A hollow piston is slidably received within the bore and creates a fluid chamber with the bore. The hollow piston, or plunger, is biased in a protruding direction from the housing by a spring.

A passage is provided in the housing to connect the fluid chamber with a source of pressurized fluid. A check valve is provided between the chamber and the source of pressurized fluid to permit fluid flow into the chamber, while blocking flow in the reverse direction. The check valve may be a ball and spring check valve, a spring valve, or a variable orifice check valve, as presently known in the tensioner art.

The tensioner also includes an external rack with an anti-backlash or backlash limitation feature. An external rack has a radially extending member that fits within a series of corresponding wedge-shaped grooves in a rack formed on the outside of the piston. The extending member slides back and forth within the corresponding grooves formed on the piston. A garter spring member, or similar resilient member, is wrapped around the outside of the radially extending member and biases the extending member toward the grooves formed on the outside or exterior surface of the piston.

The piston retention feature of the rack and ratchet system limits the maximum outward travel of the piston. After the radially extending member on the rack passes the last groove on the piston, the extending member seats within a stepped groove. As a result, no further outward movement of the piston is permitted.

BRIEF DESCRIPTION OF THE DRAWINGS

FIG. 7 is a cross-sectional view of an alternative embodiment of a tensioner with the external rack member of the present invention.

FIG. 8 is a perspective view of the external rack member of the tensioner of FIG. 7.

FIG. 9 is a sectional view along line 9—9 of FIG. 10.

FIG. 10 is a top view of the external rack member of FIG. 8.

DETAILED DESCRIPTION OF THE PREFERRED EMBODIMENTS

Figure 1:
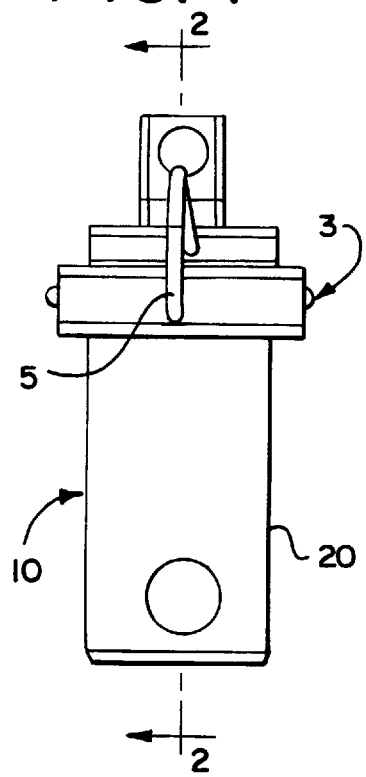
FIG. 1 is a front view of the hydraulic tensioner of the present invention.
Figure 2:
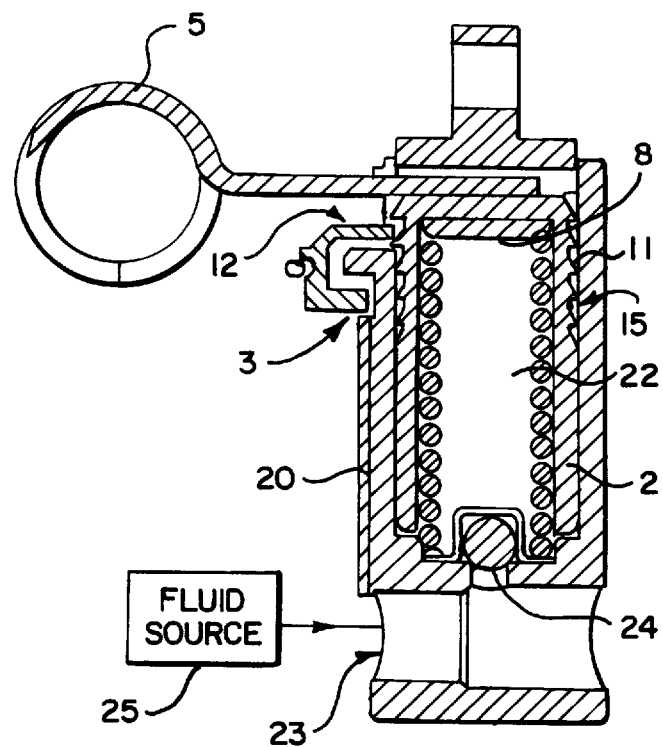
FIG. 2 is a sectional view of the tensioner of FIG. 1 taken along line 2—2, illustrating the location of the external rack member.
Figure 5:
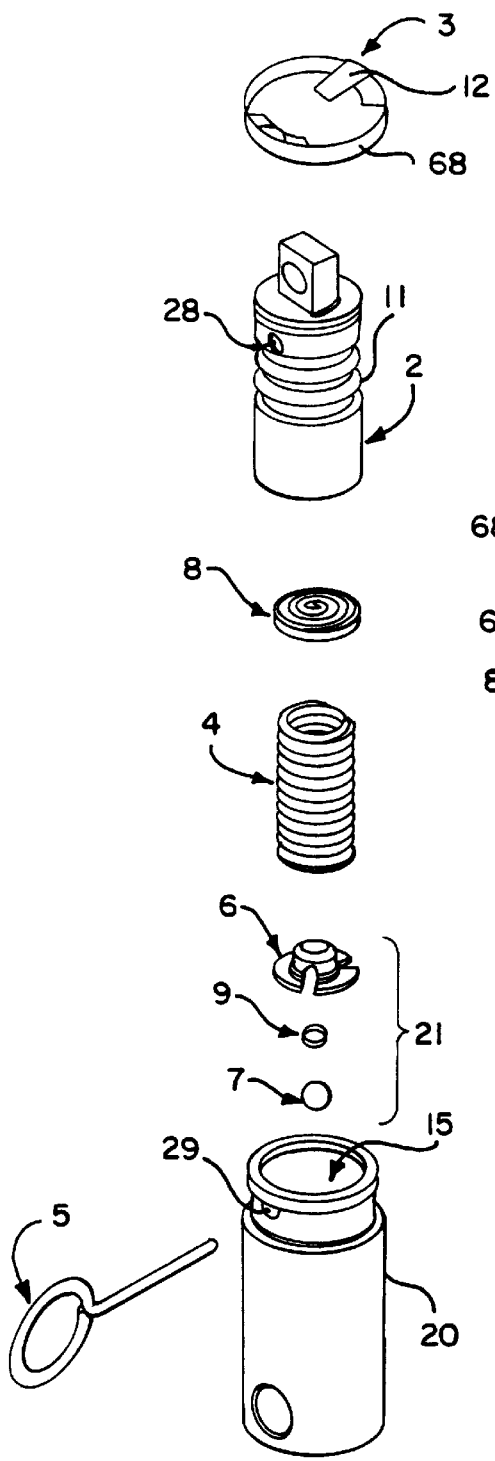
FIG. 5 is an exploded perspective view of the hydraulic tensioner of FIG. 1.

FIG. 1 illustrates the hydraulic tensioner 10 having a housing 20, a retaining pin 5, and an external rack member 3 located along the outside of the housing. As shown in FIGS. 2 and 5, a bore 15 within the tensioner housing 20 forms a fluid chamber with the interior of hollow piston 2. The fluid chamber 22 is filled with fluid through a passageway 24 from a pressurized fluid source 25. The fluid source may be an oil pump or a reservoir.

The chamber, preferably cylindrical, receives a hollow piston 2, also preferably cylindrical. The outside of the piston 2 has several grooves 11, or steps, integrally formed on the piston. The grooves 11 form a piston rack that contact an extending member 12 on the external rack member 3 as the piston moves outward from housing. A vent disc 8 is placed in the upper end of the inside of the piston, and a piston spring 4 contacts the vent disc 8 and piston to bias the piston 2 in a protruding or outward direction.

The piston is securely held in an innermost installation position by insertion of clip 5 through the aperture 28 in the piston and corresponding aperture 29 in the housing. This feature is used during shipping of the piston. The clip 5 is removed upon installation in the engine.

During start-up of the hydraulic chain tensioner, after the tensioner has been installed and installation clip 5 has been removed, the piston is pushed outward by the force of the piston spring on the piston. As a result of the pressure differential formed across the check valve 21, fluid enters through passageways 23 and 24 and flows through the check valve and into the chamber 22 while pushing air to the upper end of the chamber 22. The chamber 22 continues to fill with fluid until the force inward on the piston 2 by the chain (not shown) is balanced by the force of the spring 4 and the resistance force of the fluid in the chamber 22.

The check valve 21 is provided between the chamber 22 and the source of fluid pressure to permit fluid flow into the chamber 22, while blocking fluid flow in the reverse direction. The check valve 21 includes a ball 7, ball retainer 6, and spring 9. The spring 9 biases the ball 7 against the seat formed by the passageway 24.

Figure 3:
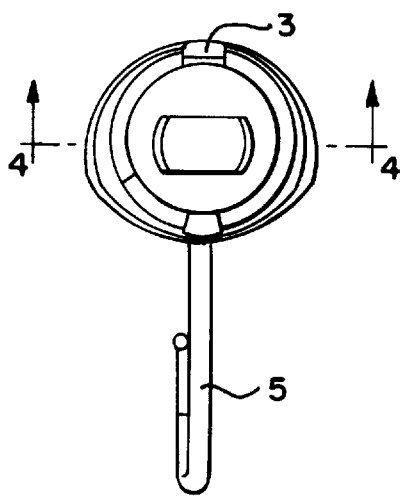
FIG. 3 is a top view of the tensioner of FIG. 1.
Figure 4:
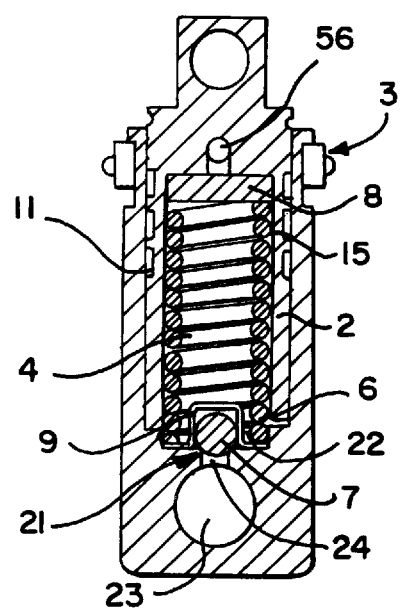
FIG. 4 is a sectional view of the hydraulic tensioner of FIG. 3 taken along line 4—4.

FIG. 3 shows the top of the tensioner 10, and FIG. 4 shows a sectional view of the tensioner 10 along line 4—4 of FIG. 3. FIG. 5 illustrates the separate parts of the tensioner 10.

Figure 6:
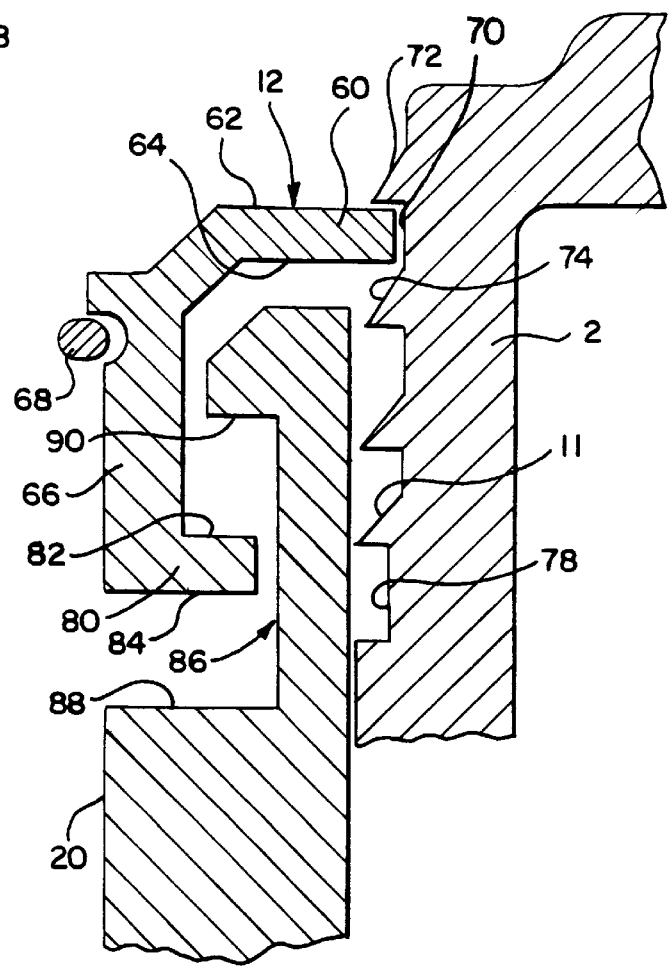
FIG. 6 is a portion of the sectional view of FIG. 2 illustrating the details of the external rack member.

The external rack member 3 of the present invention is shown in detail in FIG. 6. The external rack includes an extending member 60, which includes an upper surface 62 and lower surface 64. The extending member 60 is integrally attached to a side piece 66, which is held against the tensioner housing 20 by garter spring band 68. The extending member 60 extends a distance "D" in the axial direction as measured by the distance between the upper surface 62 and lower surface 64.

In FIG. 6, the extending member 60 is shown in groove 70, which is defined by wedge 72 and wedge 74. At the lower end of the piston, illustrated as groove 78 in FIG. 6, a stepped groove is provided to hold the extending member and prevent any further outward movement of the piston in the axial direction.

The side piece 66 of the external rack member 3 has a lower end 80, which also includes an upper surface 82 and lower surface 84. The lower end 80 travels axially in groove 86 of the housing 20. The lower limit on axial movement of the lower end 80 is the surface 88 of groove 86. Similarly, the upper limit on axial movement of the lower end 80 is the surface 90 of groove 86. In operation, such limited movement of the lower end 80 of the rack member 3 in the groove 86 of the housing enables limited backward movement of the slide 66 and hence the piston relative to the housing so as to permit a limited degree of backslash or backdrive.

A slightly modified embodiment, which has many similar features, is shown in FIGS. 7, 8, 9 and 10. A perspective view of the external rack member 100 is shown in FIG. 8. The rack member is formed from multiple pieces. The piece shown in FIGS. 8, 9 and 10 extends through an arc of 120 degrees. In the embodiment of FIG. 7, the three pieces are assembled and held together by a spring 102, which forms a cylindrical part. The spring and external rack are held within the tensioner housing 104 by a coiled pin 106.

In the embodiment shown in FIG. 7, the piston 110 slides within a bore or sleeve 112. The extending member 114 of the rack 100 slides within the grooves 116 formed on the side of the piston. The extending member 114 includes an upper surface 118 and lower surface 120. The lower surface 120 connects with the side piece 122 by angled portion 124. The spring member 102 presses against a recessed portion 126 in outside of the side piece 124.

In operation, backlash or backdrive of the piston is limited by the space in the grooves 116 formed between the wedges. As the piston is pushed further outward from the housing, the external member 114 slides over the successive wedge or piston rack portion and is then held within the next groove. A stepped groove 130 is formed so that the rack extending member 114 catches in the stepped groove and stops the piston 110 from leaving the tensioner housing. This provides an upper limit on piston travel.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:

a housing having a bore;

a hollow piston slidably received within the bore, said piston forming a fluid chamber with said bore and having a plurality of grooves formed along the outside of the piston;

an external rack member positioned radially outward from said piston in a groove in said housing, said external rack member having an upper end and a lower end and a side piece therebetween, said external rack member having an extending member located at said rack member upper end, said extending member constructed and arranged to contact said grooves along the outside of said piston to limit the piston travel in the axial direction, said external rack member having an end piece located at said lower end, said end piece being slidable within said groove in said housing, a spring member surrounding said side piece of said external rack member, said extending member being normally biased toward said piston by said spring member to contact said piston grooves;

a piston spring biasing said piston in an outward direction from said bore; and a check valve provided between the chamber and a source of pressurized fluid to permit fluid flow into the chamber while blocking flow in the reverse direction.

2. The hydraulic tensioner of claim 1 further comprising a plurality of external rack members, each of said external rack members having an extending member and an end piece, said plurality of external rack members being located about the periphery of said piston.

3. The hydraulic tensioner of claim 2 wherein said spring member biases said plurality of external rack members into a contacting relationship with one another.

4. The hydraulic tensioner of claim 3 wherein said spring member is a circular garter spring located within a recess in said side piece of said external rack member.

5. The hydraulic tensioner of claim 1 wherein said piston includes a stepped groove for contacting said extending member to provide a position of maximum outward axial travel of said piston.

6. The hydraulic tensioner of claim 1 wherein axial movement of said external rack member is limited in an outward direction by said housing groove.

* * * * *